United States Patent
Ge et al.

(10) Patent No.: US 9,924,062 B2
(45) Date of Patent: Mar. 20, 2018

(54) APPARATUS, SYSTEM AND METHOD FOR ACTIVATING FEATURES OF AN IMAGE PROCESSING DEVICE

(71) Applicants: Canon Information and Imaging Solutions, Inc., Melville, NY (US); Canon U.S.A., Inc., Melville, NY (US)

(72) Inventors: Jiuyuan Ge, Centereach, NY (US); Lance Yiuchong Leung, Forest Hills, NY (US); Song Cang, Jerico, NY (US); Jiayin Peng, College Point, NY (US); Daniel Andrew Doran, Yonkers, NY (US)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 0 days.

(21) Appl. No.: 15/209,442

(22) Filed: Jul. 13, 2016

(65) Prior Publication Data
US 2017/0019551 A1    Jan. 19, 2017

Related U.S. Application Data

(60) Provisional application No. 62/192,500, filed on Jul. 14, 2015.

(51) Int. Cl.
*H04N 1/00* (2006.01)

(52) U.S. Cl.
CPC ..... *H04N 1/00941* (2013.01); *H04N 1/00509* (2013.01); *H04N 2201/0018* (2013.01); *H04N 2201/0094* (2013.01)

(58) Field of Classification Search
USPC ........................................ 358/1.15
See application file for complete search history.

(56) References Cited

U.S. PATENT DOCUMENTS

| | | |
|---|---|---|
| 7,155,413 B2 | 12/2006 | Nakai |
| 7,477,745 B2 | 1/2009 | Nakamura |
| 7,865,445 B2 | 1/2011 | Maeda |
| 8,079,090 B2 | 12/2011 | Okada |
| 8,321,599 B2 | 11/2012 | Miyajima |
| 8,474,051 B2 | 6/2013 | Araki |

(Continued)

*Primary Examiner* — Ngon Nguyen
(74) *Attorney, Agent, or Firm* — Canon USA Inc., IP Division

(57) ABSTRACT

A system and method of authorizing one or more features of an application is provided. A first application having a first set of features that control one or more functionality of an image processing device and are always available and a second set of features controlling functionality different from that controlled by the first set of features and which require authorization to be operable. A second application executing on the image processing device includes data representing authorization parameters to selectively authorize one or more of the features in the second set of features. In response to detecting, by the second application, that a feature activation service is registered in an operating system of the image processing device by the first application, the second application communicates the authorization parameter data to the first application to authorize and make operable the one or more features of the second set of features.

31 Claims, 10 Drawing Sheets

(56) References Cited

U.S. PATENT DOCUMENTS

| | | |
|---|---|---|
| 8,533,468 B2 | 9/2013 | Osada |
| 8,544,000 B2 | 9/2013 | Ogura |
| 8,650,557 B2 | 2/2014 | Ogura |
| 8,813,081 B2 | 8/2014 | Uchida |
| 8,856,951 B2 | 10/2014 | Yuki |
| 2001/0034713 A1* | 10/2001 | Nakai ............... G06F 21/84 705/52 |
| 2008/0209569 A1* | 8/2008 | Araki ............... G06F 21/44 726/26 |
| 2012/0047242 A1 | 2/2012 | Iwasaki |

* cited by examiner

APPARATUS, SYSTEM AND METHOD FOR ACTIVATING FEATURES OF AN IMAGE PROCESSING DEVICE

CROSS-REFERENCE TO RELATED APPLICATIONS

This nonprovisional patent application claims priority from U.S. provisional patent application Ser. No. 62/192,500 filed on Jul. 14, 2015 which is incorporated herein by reference in its entirety.

BACKGROUND OF THE INVENTION

Field of the Invention

The present invention relates generally to controlling an image processing device, and more specifically, to authorizing features of applications executing on the image processing device.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other any other task.

As image processing devices have grown in complexity and ability to offer many different types of functionality in different environments, the ability to control and operate the image processing devices have been updated to reflect these capabilities. It is not uncommon for image processing devices to execute one or more applications each able to provide various functionality. In some instances, these applications provide additional features to be used in conjunction with a native feature of the image processing device. By way of example, image processing devices may execute applications that operate in conjunction with scanning or printing functionality. By way of a further example, the image processing device may perform a particular function unrelated to the native image processing functionality (e.g. printing, scanning, copying, etc.). However, a drawback associated with these configurations relates to a user of the applications executing on an image processing device is properly authorized to do so. More specifically, when developers seek to monetize applications having a plurality of different features, there is a difficulty associated with providing customers (e.g. owners/users of the image processing device) access to newly developed features that may be sold for additional cost over the original cost of the application. A system according to invention principles remedies any drawbacks associated with these conventional systems.

BRIEF SUMMARY OF THE INVENTION

Methods, systems, and computer-readable media for processing image file data are described.

An embodiment according to invention principles provides a feature activation system for activating one or more features of an application executing on an image processing device. The system includes one or more processors and a memory storing one or more applications that are executed by the one or more processors. The one or more applications include a first application and a second application. The first application has a first set of features that control one or more functions of the image processing device and are always operable and available to users of the image processing device, and a second set of features controlling at least one function different from the one or more functions controlled by the first set of features. Each feature of the second set of features requires activation to be operable and be made available to users of the image processing device. The second application executing on the image processing device includes data representing an activation parameter to selectively activate one or more of the features in the second set of features. In response to detecting, by the second application, that an activation request is issued by the first application, the second application communicates the activation parameter data to the first application to activate and make operable the one or more features of the second set of features associated with the activation parameter.

An embodiment according to invention principles describes a method of activating one or more features of an application executing on an image processing device. The method includes registering, by a first application stored in memory and executing on the image processing device, an activation request. The first application includes a first set of features that control one or more functions of the image processing device and are always operable and available to users of the image processing device. The first application also includes a second set of features controlling at least one function different from the one or more functions controlled by the first set of features, each feature of the second set of features requires activation to be operable and be made available to users of the image processing device. The method further includes detecting, by a second application stored in memory and executing on the image processing device, that an activation request has been registered by the first application with the operating system. An activation parameter included in the second application is communicated to the first application wherein the activation parameter identifies the one or more features of the second set of features to be activated. The one or more of the features in the second set of features is activated based on the activation parameter and the first application enables user access to the activated one or more features of the second set of features.

An embodiment according to invention principles includes an image processing device comprising one or more processors and a memory storing a first application that, when executed by the one or more processors operates in the following manner. The first application opens a communication channel between the first application and a second application executing on the image processing device in response to determining that the second application has registered an activation request. The second application includes a first set of features that control one or more functions of the image processing device and are always operable and available to users of the image processing device, and a second set of features controlling at least one function different from the one or more functions controlled by the first set of features. Each feature of the second set of features requires activation to be operable and be made available to users of the image processing device and the activation request requests activation of one or more features of the second set of features. The first application communicates, via the opened communication channel, an activation parameter identifying the one or more features of the second set of features to be activated and enables the first application to activate and make available to users of the image processing device the identified one or more features of the second set of features. In another embodiment, the first application registers the duration data with an operating system of the image processing device and periodically checks with the operating system to obtain a device characteristic. The first application determines that the one or more features of the second set of features should remain active when a first predetermined condition is met, and the one or more features of the second set of features should be inactivated when a second predetermined condition is met. In this embodiment, the device characteristic is an expiration event. The first predetermined criteria is determined to be met when a value of the duration data included in the first application is earlier in time than a current date and the second predetermined criteria is determined to be met when a value of the duration data included in the first application is later in time than a current date. In response to determining that the second predetermined condition is met, the first application generates a deactivation parameter including information indicating that the one or more features of the second set of features is to be inactivated. The deactivation parameter is communicated to the first application causing the indicated one or more features of the second set of features to be unavailable to users of the image processing device.

An embodiment according to invention principles includes an image processing device. The image processing device includes one or more processors and a memory storing a first application. The first application includes a first set of features that control one or more functions of the image processing device and are always operable and available to users of the image processing device, and a second set of features controlling at least one function different from the one or more functions controlled by the first set of features, each feature of the second set of features requires activation to be operable and be made available to users of the image processing device. The first application, when executed by the one or more processors registers an activation request with the image processing device receives an activation parameter from a second application that has opened a channel with the first application in response to the second application detecting the registration of the activation request. The activation parameter is parsed to identify one or more features of the second set of features to be activated and a user interface display image is generated including user selectable image elements representing the first set of features and the activated one or more features of the second set of features. In another embodiment, the first application, prior to receiving the activation parameter, generates a user interface display image including user selectable image elements associated with the first set of features and image elements associated with the second set of features that cannot be selected by a user. The first application may also receive a deactivation parameter including information indicating that the one or more features of the second set of features to be inactivated. The deactivation parameter is generated by the second application in response to the comparing a device characteristic obtained from the image processing device with the activation parameter and determining that the one or more features of the second set of features is to be inactivated. A user interface may then be modified by causing image elements associated with the one or more features of the second set of features to be inactive.

In one embodiment, a system for authorizing one or more features of an application executing on an image processing device is provided. The system includes a first application having a first set of features that control one or more functionality of an image processing device and are always available and a second set of features controlling functionality different from that controlled by the first set of features and which require authorization to be operable. A second application executing on the image processing device includes data representing authorization parameters to selectively activate and authorize one or more of the features in the second set of features. In response to detecting, by the second application, that a feature activation service is registered in an operating system of the image processing device by the first application, the second application communicates the authorization parameter data to the first application to authorize and make operable the one or more features of the second set of features.

In another embodiment, an image processing device is provided. The image processing device includes at least one processor and a memory having one or more applications stored therein that, when executed by the at least one processor enables the image processing device to perform selectively activation of a set of features provided in the one or more applications. A first application is stored in the memory. The first application includes a first set of features that control one or more functions of an image processing device and are always available and a second set of features controlling functionality different from that controlled by the first set of features and which require authorization to be operable. The first application registers with an operating system of the image processing device an activation service and the first application receives an activation parameter from the second application in response to a second application determining that an activation service has been registered. Based on the data included in the activation parameter, the first application authorizes and makes operable one or more features of the second set of features.

In another embodiment, an image processing device is provided. The image processing device includes at least one processor and a memory having one or more applications stored therein that, when executed by the at least one processor enables the image processing device to perform selectively activation of a set of features provided in the one or more applications. An activation application includes an activation parameter used to activate one or more features of a set of features of a main application stored in memory and executing on the image processing device. The activation application, in response to determining that a feature activation service has been registered by the main application in an operating system of the image processing device, checks a validity of the information included in the activation parameter and communicates the activation parameter to the main application to activate the set of features the main application. The second application further periodically checks that the activation parameter is valid and, in response to determining that the activation parameter is invalid, communicates a deactivation parameter to the main application rendering the set of features of the main application inoperable.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

Figure 1:
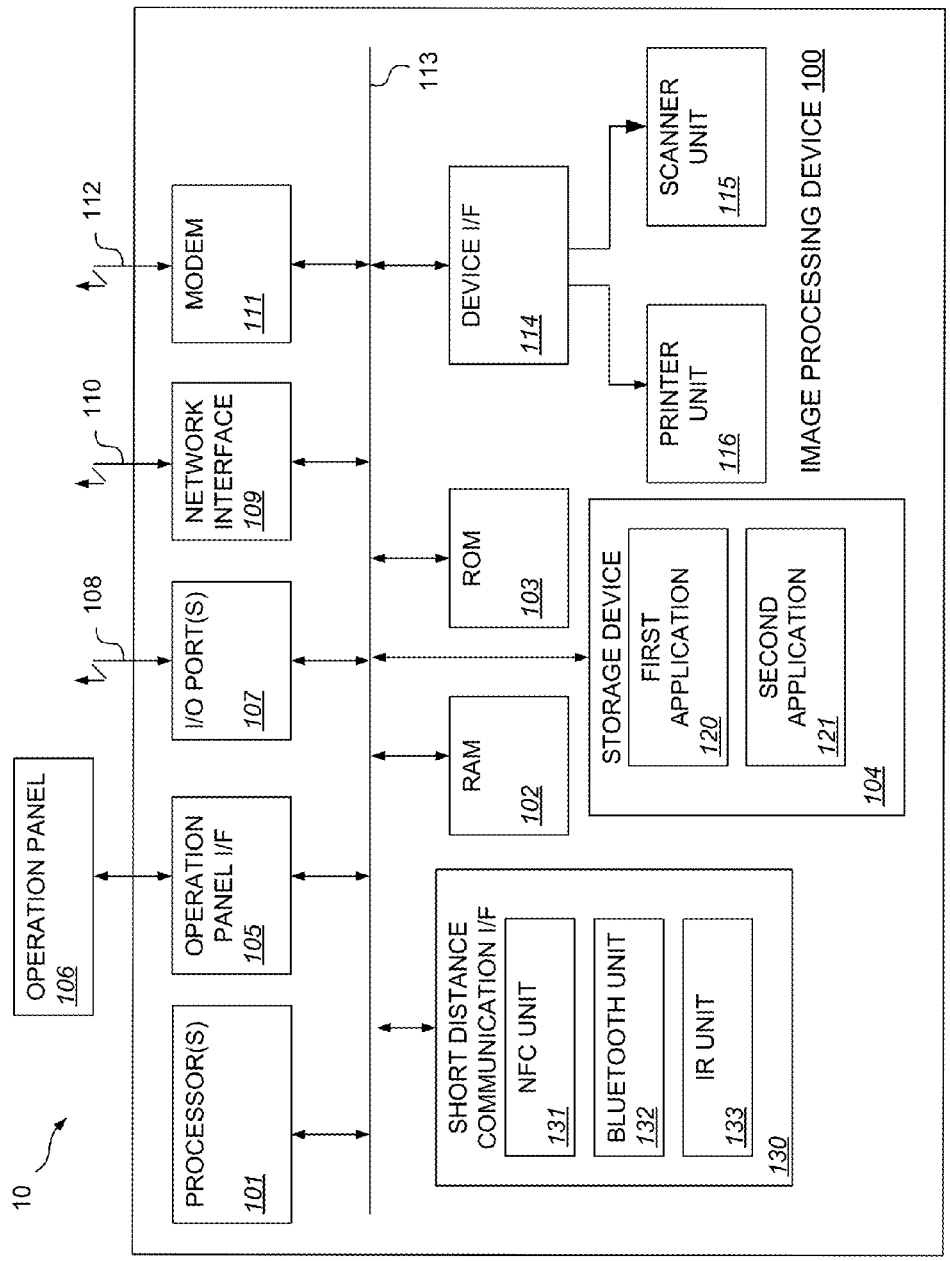
FIG. 1 illustrates an exemplary image processing device according to invention principles.

Embodiments of the present invention are described with reference to the drawings. In accordance with invention principles, an image processing device is provided and includes one or more applications stored on a storage device included therein. The one or more applications comprise a set of instructions that, when executed control particular hardware elements of the image processing device to operate in a desired manner to produce particular type of functionality. The one or more applications, when executed by one or more processors of the image processing device provide respective types of functionality that may use of various components of the image processing device. The one or more applications executing on the image processing device include at least two sets of features. A first set of features includes basic features that, when executed by the one or more processors, may be identified and presented for user selection in a user interface generated by the one or more applications. The basic features of any application comprise those features that, upon initiation of the one or more applications executing on the image processing device, will always and automatically be presented to the user. The basic features of the application may be presented to a user in a user interface (or linked to an operational button of the image processing device) who is then able to selectively determine which of these basic features to use at a given time. The second set of features include one or more features that are included within the one or more applications but which are not automatically made available to a user in response to initiating the one or more applications. Instead, the respective features in the second set of feature require activation in order for them to be selectable by a user to take advantage of these features. As used herein, activation of one or more features of the second set of features means that any of the second set of features is authorized by an authorization entity in order for any user to gain access to respective features of the second set of features. Structuring an application having two sets of features, a first set of features that will always be available upon initiation of the application and a second set of features where one or more features of the second set of features is selectively available to a user, provides a strategic advantage in application development and deployment. This is especially true in an environment of an image processing device because all of the functionality capable of being performed by the application is included therein. This presents an advantage because it avoids the difficulty encountered when more than one application needs to interact with one another to provide related functionality. This problem is exacerbated when considering an operating system environment with strictly enforced security parameters that result in individual applications being forced to operate individually and not make use of functionality provided by any other application. As used herein, operating system may include any software executed by one or more processors that manages hardware and software resources and enables other applications to function and make use of device resources, components and functionality. Additionally, operating system may also include an application management framework that controls a set of modular applications that allows each application to declare its dependencies with any other application. In the embodiment where the operating system is a framework, each application is unable to directly communicate with any other application without notifying the framework of the intention to do so. Once declared, applications can communicate data therebetween. By way of example, an operating system representing a framework is in an Open Services Gateway Initiative (OSGi) compliant environment. In this environment, all applications executing are forced to operate separately from one another and security parameters are strictly enforced. Thus, the drawback in this environment occurs where two applications having related functionality and which are dependent on one another. Because of the enforced security structure of the operating environment, each application would be required to maintain related files separately under each application thereby severely impacting system processing and storage resources, both in persistent memory and non-persistent memory.

According to invention principles having a first application with a first set of features that are always available and second set of features that require activation to be available, improves the overall resource utilization of the image processing device. Moreover, the development and update costs and efforts related to maintaining and approving the application is significantly reduced because the developer need only to work within a single application. A further advantage provided by this arrangement allows for a person or entity responsible for selling/providing the application for deployment on an image processing device, to further control access to (or monetize these features) one or more features of the application by selectively activating at least one feature of the second set of features of the application. This selective activation is performed by advantageously deploying a second application (e.g. an activation application) for storage on a storage device and that is executed by the one or more processors of the image processing device. The second application includes an activation parameter that identifies features of the second set of features to be available to a user. In one embodiment, the activation parameter includes at least one secret key value which corresponds to one or more features of the second set of features to be activated. In another embodiment, the activation parameter includes a plurality of secret key values each corresponding to a respective feature of the set of features to be activated. In additional to the activation parameter, the second application includes duration information that indicates a length of time that the features identified in the activation parameter are to remain active. In certain embodiments, the duration information is a license that specifies a length of time that the features in the activation parameter are to remain active. In further embodiments, duration information includes durations of time for a plurality of features such that different features of the second set will be available for different time periods.

The activation parameter included within the second (activation) application is communicated to the first application. The first application parses the data included in the activation parameter to identify the one or more features of the second set of features to be activated by comparing the activation parameter data with an activation data store. Features of the second set of feature determined to have data identifiers matching the activation parameters can then be flagged to be operable. In one embodiment, once features are determined to be operable, the first application may generate a user interface display image for presentation to a user of an image processing device. The generated UI may include selectable image elements corresponding to the features of the second set of features in conjunction with one or more image elements representing the basic features which are available to all users at all times.

The second (activation) application also may include a validation procedure that interacts with system parameters of the image processing device to determine if the data represented in the activation parameter is valid at a given time. In operation, the second application licenses to the operating system of the image processing device for a license expiration event that indicates that duration data included as part of the second application and which had been registered with the operating system has expired. For example, the duration data of the second application may include an expiration date which is registered with the license service of the operating system which will then determine when the expiration date has been reached to generate an expiration event. The second application periodically checks by listening for any license events and, when detecting that an expiration event has occurred, the second application determines that the features identified by the activation parameter of the second application should be invalidated. If the validation procedure determines that the activation parameter is invalid, a deactivation parameter is generated and provided to the first application thereby disabling any features of the second set of feature that was previously been authorized. The deactivation parameter may function to remove identifiers representing features of the second set of features from an activation data store of the first application. The effect of this removal will result in a modified user interface being generated to one of remove image elements associated with features of the second set of feature that were previously activated. In another embodiment, removal of the identifiers from the activation data store may result in modifying a previously generated user interface to render image elements associated with features of the second set of features inactive and unavailable for selection. The description that follows provides a structural and functional description of the activation system according to invention principles.

An image processing device 100 illustrated in FIG. 1. The image processing device 100 may be a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1 could be combined, deleted, or modified to form further implementations. Further by way of example, in some embodiments, other devices (for example, other devices having scanning capabilities) and/or servers (for example, a computer connected to a scanner) may be implemented as the image processing device 100.

In some embodiments, the image processing device 100 performs one or more operations described herein. In some embodiments, the image processing device 100 provides functionality described herein. In some embodiments, one or more software applications running on the image processing device 100 performs one or more operations described herein. In certain embodiments, applications executing on the image processing device 100 and which provide specific types of functionality are in communication with and bidirectional communicate data between the applications executing on the image processing device 100.

The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various applications and/or programs stored in one or more memory devices 104. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices 104.

The RAM 102 is used as a work area when the processor(s) 101 execute various instructions, such as those making up computer programs stored in the ROM 103 and/or the storage device 104. The RAM 102 may be used as a temporary storage area for various data, including input image data and data created by an application executing on the image processing device 100 or data received from one or more mobile computing devices 200 which is then further processed by one or more applications executing on the image processing device 100. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 1203 may be flash memory. In certain instances, the ROM 103 may include an operating system for controlling the operation of the image processing device 100. In this case, an operating system application stored in ROM 103 (or alternatively stored in the storage device 104 and accessible once the boot routine of the image processing device 100 is completed), contains a catalog of other applications executing on the image processing device and provide information about such other executing applications to one another enabling interoperation there between.

An operation panel interface 105 provides output signals to and receives input signals from an operation panel 106. Regarding the output signals, the operation panel interface 105 provides GUI data to the operation panel 106 for display on a display device such as liquid crystal display (LCD) or a light emitting diode display (LED). Regarding the input signals, the operation panel interface 105 receives input signals based on user input operations at the operation panel 106 and relays the input signals to the processor(s) 1201. In some embodiments, the operation panel 106 includes a touch sensitive element operable to receive user input operations or commands based on the touching of graphical objects displayed on the display. In some embodiments, the operation panel 106 includes a hard key panel.

The image processing device 100 includes one or more input/output (I/O) port(s) 1207. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107.

A network interface 109 includes hardware, software, or both providing one or more interfaces for communication (such as, for example, packet-based communication) between the image processing device 100 and one or more other servers or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

The device interface 114 is connected to the scanner unit 115 and to the printer unit 116. The device interface 114 performs synchronous/asynchronous conversion of image data.

The scanner unit 115 includes a light source and an image sensor. The scanner unit 115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 115 includes an optical system (for example, mirrors, lens) that directs the light to the image sensor. After the image sensor generates the electrical signals, an analog-to-digital converter converts the electrical signals to digital image data representing the scanned physical document. The scanner unit 115 then outputs the digital image data to one or more other components of the image processing device 100 via the device interface 114.

The printer unit 116 is an image output device for printing on a sheet an image corresponding to image data. In response to a print command received at the image processing device 100, the printer unit 116 receives image data via the device interface 114 and outputs to a sheet an image corresponding to the image data.

Image processing device 100 may also include a short distance communication interface (I/F) 130. The short distance communication interface 130 facilitates communication between one or more applications executing on the image processing device 100 and at least one mobile computing device (not shown) using one or more short distance communication protocols. Thus, the short distance communication interface 130 includes a near field communication unit 131 (for example, an NFC reader) enabling bidirectional communication with a mobile computing device having NFC functionality. The NFC unit 131 includes circuitry and software that enables transmission (writes) and reception (reads) of commands and data with a non-contact type device using a short distance wireless communication technique such as NFC (Near Field Communication; ISO/IEC IS 18092). In other embodiments, the short distance communication interface 130 may also include a BLUETOOTH communication unit 132 that includes a transceiver capable of transmitting and receiving data via short wavelength radio waves ranging in frequency between 2.4 GHz and 2.485 GHz. In other instances, the short distance communication interface 130 may also include an infrared (IR) unit that can emit and sense electromagnetic wavelengths of a predetermined frequency have data encoded therein. Furthermore, while not specifically shown, the short distance communication interface may also include a smart card reader, radio-frequency identification (RFID) reader, device for detecting biometric information, a keyboard, keypad, sensor(s), a combination of two or more of these, or other suitable devices. In another embodiment, the short distance communication interface 130 may include an optical scanner configured to capture and scan image data representative of an identification code such as a barcode or a QR code. In these embodiments, the capture and processing of a particular identification code may initiate the short distance communication between the mobile computing device 200 and the image processing device 100.

The depiction of the short distance communication interface 130 is done merely to facilitate the understanding of the operation of the present arrangement and it should be understood that the short distance communication interface 130 may also be embodied as part of the I/O ports 107 and/or the network interface 109.

A storage device 104 stores application data, program modules and other information. One or more program modules stored in the storage device 1204 are configured to cause various operations and processes described herein to be executed. The storage device 104 also stores other programs and data to be processed. For example, the storage device 104 stores an operating system including programs and data for managing hardware and software components of the image processing device 100. Applications on the image processing device 100 may utilize the operating system to perform various operations. The storage device 104 may further store other programs and/or drivers that enable various functions of the image processing device 100, graphical user interface (GUI) functions, and/or processor functions. The storage device 104 may also store data files including, for example, image data, user data, configuration information, GUI components, such as graphical elements or templates, or other data required by the image processing device 100.

In some embodiments, the image processing device 100 includes one more applications including one or more programs for controlling access to one or more resources on the image processing device 100. In some embodiments, applications stored in the storage device 104 includes one or more programs for controlling access to one or more applications (or particular functionality thereof) executing on the image processing device 100.

In some embodiments, access to one or more resources of the application is controlled based on a credential associated with the entity attempting to access the one or more resources of the application. Policies for controlling access to various resources of the application may be stored at the image processing device 100. In other embodiments, access control policies may reside in a centralized or enterprise server remotely located from the image processing device 100. Once access to an application is granted, a user gains access to one or more resources of the application, including task-specific functionality of the application. The task-specific functionality of the application may enable the user to perform one or more tasks using the application. For example, the application 100 may provide various functions, features and user interfaces for processing image data, transmitting data over a network, managing one or more databases, or other tasks. In some embodiments, the application 100 is configured to use one or more resources of the image processing device 100 to perform a process in response to an instruction from the user.

An application executing on image processing device 100 may use functionality of and/or information on the image processing device 100 to employ hardware, software, or both for that provides scanning functionality. For example, the image processing device 100 may include an image sensor or a camera for capturing an image.

In certain embodiments, the application executing on the image processing device 100 provides communication functionality for transmitting image file (or other electronic document data file format) via a network (see FIG. 2) to any other computing system and/or server connected thereto. The communication functionality of the application may be implemented by interaction with the network interface 109 which converts data into a transmissible data form able to be communicated over a network 50 to server 106 (or other computing system). In addition to, or instead of using the network interface 109, application functionality that requires transmission of data may be performed using the short distance communication interface 130 (including any and all types of short distance communication described herein). The application may also enable the image processing device 100 to receive instruction data from other systems on the network enabling access to and control of any functionality provided by application. The receipt of data from the server or other computing device may similarly occur using any of the network interface 109, short distance communication interface 130 or the like. The communication functionality of application may also enable the image processing device 101 to receive and process data objects generated by any system connected to the image processing device 101 via the network.

In some embodiments, the application executing on the image processing device 100 provides functionality for maintaining and accessing information in a data structure, which may be any suitable data structure for organizing data. For example, information associated with a user or process may be added as one or more entries into a data structure. The application executing on the image processing device 100 may store and/or retrieve data in a memory or on a hard disk of the image processing device 100. In some embodiments, the image processing device 100, when executing the application, may perform various operations with respect to a data store. Examples of operations include adding entries to a data store; deleting entries from a data store; modifying entries in a data store; searching for entries in a data store; and retrieving entries from a data store. The data store management functionality provided by application discussed above is also applicable to data stores located on remote computing systems and/or servers connected to the image processing device 100 via the network.

The application executing on the image processing device 100 may provide functionality for generating information and providing the information to a user interface of the image processing device 100 displayed on operation panel 106. The information may include text, images, form elements, files, executable programs, or other suitable information. The information provided by the application may include content for display on a display of the image processing device 101.

In another embodiment, the storage device 104 stores a first application 120 having a plurality of task-specific features enabling a user to initiate and execute a variety of different functionality using one of the scanning and/or printing components of the image processing device 100. In certain embodiments, the first application 120 may utilize the credential-based task access functionality discussed above thereby providing users with a secure mechanism to authorize the different transmission mechanism for transmitting data generated by the scanning unit 115 of the image processing device 100. By way of example, the first application 120 may include a first set of features that include basic task-specific features. In one embodiment, the first set of features includes scan-to-email, scan-to-fax, scan-to-folder, scan-to-FTP, scan-to-cloud that require user authentication prior to a user being able to execute the send processing of these features. Each feature included in the first set of feature is automatically made available for selection and use by a user of the device having valid authorization credentials. In this manner, when the first application is initiated, the first application causes at least one user interface to be generated which includes selectable image elements representing respective features of the first set of features. Selection of an image element results in a feature selection signal being generated and causes instructions stored in memory representing the selected feature to be executed to enable operation of the selected feature of the first set of features.

The first application 120 further includes a second set of features that are not automatically made available to a user upon initiation of the first application 120. The second set of features include one or more task-specific functions that may relate to the basic features of the first application 120. In other embodiments the one or more task-specific features are unrelated to and provide different functionality than the basic features. The functionality of each feature of the second set of features will remain dormant (e.g. not available for execution by the one or more processors 101) and not available to a user unless and until the first application 120 has activated the features. That is to say, the instructions for implementing any of the features of the second set of features will not be processed or executed by the one or more processors until an activation signal is received by the first application 120.

The first 120 application may include an activation data store that includes a list of all features of the first application 120 along with an indicator associated with each listed feature that identifies the feature as part of the first set (e.g. basic feature) or second set (e.g. additional feature). The activation data store may further include a key value identifier associated with each feature of the second set of features. An activation signal including an activation parameter comprising one or more key value data items may be received by the first application 120 and features listed in the activation data store having matching key value data items associated therewith would be activated by changing an activation value in the activation data store for the respective feature. In one embodiment, when the key value data items match, the particular feature of the second set of features which has been activated may be flagged as operational.

An exemplary activation data store is shown in Table 1 below. The data store in Table 1 references generically, the features as basic or additional as their classification and availability. The actual functionality of the basic and/or additional features is not particularly germane to the present invention.

TABLE 1

Activation Data Store

| Feature Name | Individual Key Value | Group Key Value | Activation value |
|---|---|---|---|
| Basic Feature 1 | N/A | N/A | Active (1) |
| Basic Feature 2 | N/A | N/A | Active (1) |
| Additional Feature 1 | Key1 | Key1-2; Key1-3 | Active (1) |
| Additional Feature 2 | Key2 | Key1-2 | Inactive (0) |
| Additional Feature 3 | Key3 | Key1-3 | Active (1) |

In the exemplary activation data store shown in Table 1, basic features 1 and 2 do not have any individual or group key values associated therewith because they are basic features which are always available to any user of the image processing device 100 so long as the user is authorized to access and use the image processing device 100. As such, their activation value is listed as "active". In some embodiments, the activation value may be a binary representation whereby an application that is "active" is identified by the bit "1" and an application that is "inactive" is identified by the bit "0". In further embodiments, the activation value of the activation data store may be a flag value which indicates features as "active" when a flag or "true" value is listed therein and inactive when no flag or a "false" value. The first application 120 also includes Additional Features 1-3 that each have their own key value associated therewith as shown in the key value column of the activation data store. The particular data values shown in Table 1 are intended for illustrative purposes only and it should be understood that the data values for each key value and group key value will be a value that masked, randomized or any other manner to prevent easy deciphering thereof. In one embodiment, the activation parameter contained in the activation signal may include data values "key1" and "key3" indicating that additional features 1 and 3 should be active and made available to the user. As such, the activation value is "active" (or "1" in binary). Now, when the first application 120 generates a user interface for display to a user of the image processing device, the first application 120 parse the activation data store to locate features having activation values of "active" and generating user selectable image elements corresponding to the active features for inclusion in the user interface.

Referring back to Table 1, instead of the activation parameter having individual key values associated with additional features 1 and 3, the activation parameter may include a combined key value "key1-3" which indicates that additional features 1 and 3 should be activated together. The result is the same as discussed above and need not be repeated. The only difference is the manner of identifying which additional features should be activated.

To facilitate activation of the additional features of the first application 120, a second application 121 is to be one of installed or deployed on the image processing device 100. The second application 121 may be created by an administrator who is responsible for enabling access to the various features of the first application 120. In some embodiments, a dealer who provides a user with the image processing device 100 via an economic transaction (e.g. sale, lease, etc.) may also provide the user with the first application 120 that includes the basic features and all additional features. The dealer may then selectively configure, based on further economic transactions (e.g. sale, lease, trial, etc.) which of the additional features (if any) are to be available to a given user of the image processing device 100. To control this, the second application 121 is an activation application which may be separately configured and/or programmed to activate respective ones of the additional features included in the second set of features (e.g. the additional features 1, 2 and/or 3 shown in Table 1). By way of example, the second application 121 may be generated by a management application 212 executing on a client computing device 210 shown in FIG. 2. The second application 121 (also referred to herein as an activation application) is configured to include an activation parameter that identifies which additional features of the second set of features is to be activated. The activation parameter may include data representing a key value associated with one or more of the additional features of the first application 120. The second application also contains duration information separate from the activation parameter. The duration information identifies a period of time that the additional features associated with the key value (e.g. activation parameter) are to remain active. In another embodiment, the activation parameter may include an application identifier that identifies the particular application executing on the image processing device 100 that includes features to be activated using the activation parameter.

The functionality of the first application 120 and second application 121 will now be discussed. The first application 120, upon initiation of the image processing device (or of initiation of the first application itself) sends an activation request to activate one or more of the additional features of the first application 120. In one embodiment, the activation request includes the first application 120 registering a service with an operating system. The service registered with the operating system is an activation service.

The second application 121 is deployed on the image processing device 100 and uses the duration data (e.g. license information) to register a license with the operating system of the image processing device enabling the license management service of the operating system to monitor the validity of a license. The second application 121 also includes a communication function to detect if any application executing on the image processing device 100 has issued an activation request to an operating system of the image processing device. In one embodiment, the second application 121 listens for any activation service registration events generated by the operating system. The second application 121 generates an activation signal including the activation parameter for communication to the application that issued the activation request (e.g. registered the service). For purposes of ease of understanding, the follow description will presume that the first application 120 has issued the activation request to the operating system of the image processing device 100. However, persons skilled in the art would readily understand how there could be multiple applications having sets of features that are not always active but which may be activated in the same manner as discussed herein. Moreover, it should be understood that the activation signal generated by the second application 121 may be used simultaneously by multiple applications.

The second application 121 also includes a validation function which is initiated each time the second application 121 is loaded into memory of the image processing device. The validation function uses the duration data to determine of the features identified in the activation parameter should remain active. In one embodiment, the second application 121 listens for license expiration events indicating that a license in accordance with the duration data has expired. In another embodiment, the second application 121 compares duration data included within the second application 121 with system characteristic data imported from the system layer of the image processing device 100 to determine if the current characteristic data is within the range provided in the duration data. In one embodiment, the duration data may include an expiration date and the characteristic imported from the system layer is a current date value. Thus, the validation function will determine that the current date is prior to the expiration date thereby indicating that activation parameter is valid and controlling the communication function to generate and communicate the activation signal to the first application 120.

In the event that the validation function determines that the features identified in the activation parameter should be invalidated, the second application 121 generates a deactivation parameter which withdraws the activation parameter from the first application. In withdrawing the activation parameter, the first application 120 will change the activation status for that feature from active to inactive and prevent that feature from being exposed or selected for use by the user. In one embodiment, when an identified feature matching that the current date exceeds or is later than the expiration date, the validation function will control the communication function to generate a deactivation parameter that includes key value for features that have now been determined to be invalid. The deactivation parameter may be used by the first application 120 to change the status of the activation value in the activation data store from active to inactive thereby removing the availability of the additional features unless and until a new activation application having valid duration data is installed and executed by the image processing device.

The use of date as the duration data is described for purpose of example only. The nature of the duration data may be any data value that is set in the second application by the management application and which can also be obtained by the second application 121 from one of the operating system of the image processing device 100. The duration data may also include a value that may be derived from another application executing on the image processing device 100 after the second application 121 has been deployed thereon. In some embodiments, the duration data may include a list of authorized users such that, in response to authentication of the user, the second application 121 may identify the authenticated user to determine if the authenticated user is one of the permitted users included in the duration data. If the user authenticated on the image processing device 100 does not match, the second application 121 will generate a deactivation signal including the deactivation parameter. In another embodiment, the duration data may include a total number of uses data value identifying a total number of allowable executions that the image processing device 100 may execute one or more of the additional functions of the first application. In this embodiment, the second application 121 may query the number of times a particular function has been executed by the image processing device 100 and increment this value in response each subsequent execution. If the second application 121 determines that the total number of executions is less than the allowed number of executions the activation signal will be generated whereas if the number of total executions exceeds the allowed executions, a deactivation signal will be generated.

In operation, the activation system described herein has the first application 120 and second application 121 working in conjunction with one another whereby each of the features described above are performed upon initialization of the image processing device 100. Upon initialization of the image processing device 100 the first application 120 and second application 121 are initiated. Separately, the first application 120 issues an activation request to the operating system 121 and the second application 121 notifies the operating system that it is available. The second application 121 looks to the operating system to determine if any activation requests have been registered. Thereafter, the second application 121 performs the validation function to ensure that any features identified in the activation parameter contained therein are to remain valid and the communication function to communicate the activation signal including the activation parameter to the first application 120. In one embodiment, the second application 121 may import the activation service initiated by the first application 120 using a remote procedure call to generate the activation signal and use a function call to communicate the activation signal including activation parameter to the first application 120. The first application 120 receives the activation parameter and parses the parameter to identify key value data associated with the additional functions to be activated. The first application 120 queries the activation data store to change the activation value of the features identified in the activation parameter from inactive to active. Thereafter, when a user seeks to make use of the first application for task specific application processing, the first application 120 will generate a user interface including user selectable image elements enabling a user to make use of the additional features which have been determined to be active along with the basic features of the first application which are always active.

The nature of this activation scheme further advantageously reduces the difficulty in removing features able to be used by a particular image processing device 100 by controlling the type and nature of the user interface generated and functions enabled thereby. Until now, an administrator/dealer would have to install and uninstall different versions of the applications each having different feature sets associated therewith. However, the activation system according to invention principles advantageously enables the image processing device 100 to securely control access to features of particular applications using minimal system resources and minimal user interaction to do so.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

In some embodiments, the first application 120 and/or second application 120 may provide one or more of the above described functions by creating one or more data objects associated with one or more of the above functions. For example, the second application may create data objects including the activation or deactivation parameters. The data object is information which may be incorporated in and/or used by the first or second application. In some embodiments, the data object is processed as an entity distinct from other information or components incorporated in or used by the application. The data object may include information grouped together by the application. A representation of the data object may be presented in a graphical user interface (GUI) as a discrete unit, which may include one or more elements. In some embodiments, the data object may be stored in one or more locations. The data object may include one or more of the following: a data entry, a file, a portion of a file, executable code, a form element, an image, or other content. The application and the associated data object may be any suitable software application and data object, respectively.

In certain embodiments, the image processing device 100 may include a browser executing thereon. The browser may be a web browser such as MICROSOFT INTERNET EXPLORER, GOOGLE CHROME or MOZILLA FIREFOX, and may be used to access a resource, such as a web page. The browser may enable a user to display and interact with text, images, form elements, or other information typically located on a web page served by a web server on the World Wide Web or a local area network. The browser may support various types of downloadable, executable, software modules, such as applets or plug-ins. For example, the browser may incorporate a virtual machine configured to execute a program, such as a JAVA applet, embedded in a web page accessed by the browser. The image processing device 101 may have various add-ons, plug-ins, or other extensions for use in or with the browser.

Figure 2:
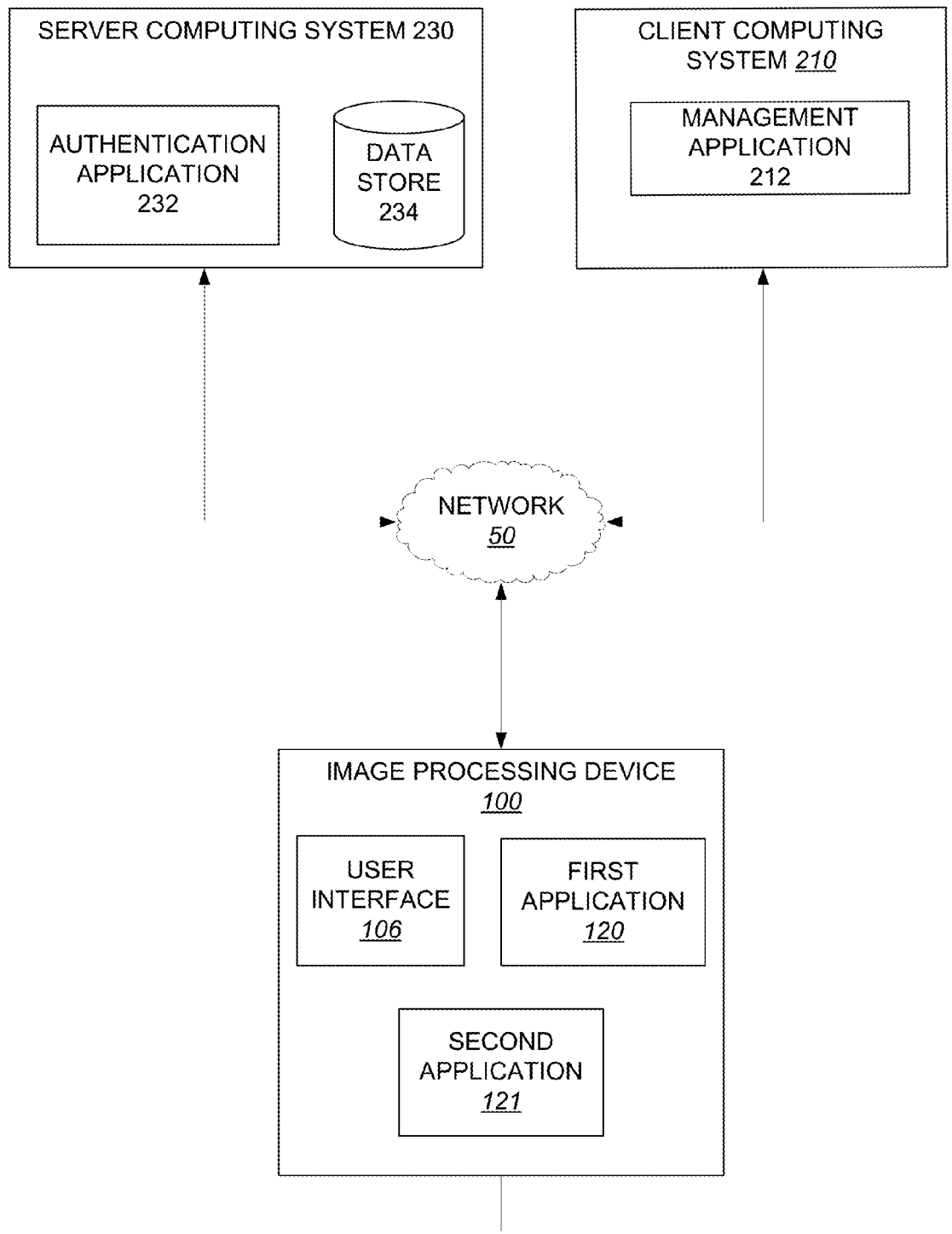
FIG. 2 illustrates an exemplary network configuration according to invention principles.

Turning now to FIG. 2 which describes a networked environment that details how the second (e.g. activation) application 121 may be generated and deployed to the image processing device 100 and able to activate the features of the first application 120. In this exemplary arrangement, a client computing system 210, a server computing system 230 and the image processing device 100 are all interconnected via a network 50. The network 50 couples the one or more computing devices 210, one or more servers 230 and one or more image processing devices 100. The network 50 may be any suitable network. For example, one or more portions of the network 50 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. The network 50 may include one or more networks.

In one embodiment, a client computing system 210 includes a management application 212 executing thereon. The management application 212 may generate one or more user interfaces that enables an administrator to configure and/or selectively define the activation parameter included in the second application 121. In doing so, the management application 212 enables the user to specify which features of the second set of additional features of the first application 120 executing on the image processing device 100 is to be made available. The management application 212 further enables specification of duration data identifying a duration that the features of the second set of features selected for activation are to remain active and available for use. Thus, the management application 212 generates data representing the second application 121 and the associated activation parameter and duration data which will be deployed on the image processing device 100. In one embodiment, upon specifying the data included in the activation parameter, the management application 212 executes a remote installation procedure whereby the second application 121 is automatically installed into the storage device of the image processing device via the network 50.

In another embodiment, the management application 212 communicates with an authentication application 232 on a server computing system 230. The server 230 includes hardware, software, or both for providing the functionality of the server 230. The server 230 may include one or more servers. For example, the server 230 may include one or more application(s) servers, authentication servers, web servers, file servers, database servers or mail servers. In some embodiments, the server 230 is unitary. In some embodiments, the server 230 is distributed. The server 230 may span multiple locations. The server 230 may span multiple machines.

The management application 212, after receiving data identifying the features to be activated, generates a request including data representing the features. The management application 212 communicates the request via the network 50. Upon receipt of the request from the management application 212, the authentication application 232 may query the data store 234 for key values corresponding to the features included in the request and provide key values associated with the features in a response message communicated from the server computing system 230 to the client computing system 210. The management application 212 sets the activation parameter to include the key values obtained from the response message generated by the authentication application 232 and communicated via the network 50.

While the second application 121 is described as being deployed to the image processing device 100 via the network 50, it should also be noted that the second application 121 may also be deployed by directly connecting the client computing system 210 to the image processing device 100 via any of the connection mechanisms described in FIG. 1. In other embodiment, the client computing system 210 may store the second application 121 on a removable storage device (e.g. flash memory drive) which may be directly connected to the image processing device 100 (e.g. via a USB port) resulting in automatic installation thereof. In another embodiment, the portable communication device such as a mobile phone may be used to deploy the second application 121 on the image processing device. In this embodiment, a portable communication device may use short range communication protocols (e.g. Bluetooth® and/or near field communication) to establish a connection between itself and the image processing device 100 to transfer data representing the second application 121 including the activation parameter to the image processing device 100 to be installed thereon.

In certain embodiments, the owner of the client computing system 210 is a different entity than each of the owner of the server computing system 230 and the image processing device 100. In one example, the owner of the client computing system is a dealer entity who has provided the image processing device 100 which was manufactured by the owner of the server computing system 230 to a customer/user based on a completed economic transaction. This is merely one possible ownership situation that is possible and any ownership arrangement may be applicable.

It should be understood that the architecture and systems describe hereinabove with respect to FIGS. 1 and 2 are merely representative and should not be construed as limiting. The architecture in which the present invention is operative may include any number of image processing devices, computing systems and/or servers. Moreover, the functionality described above is described to facilitate the understanding of invention principles and one or more of the component systems described individually may be combined with any of the other components described therein.

Figure 3:
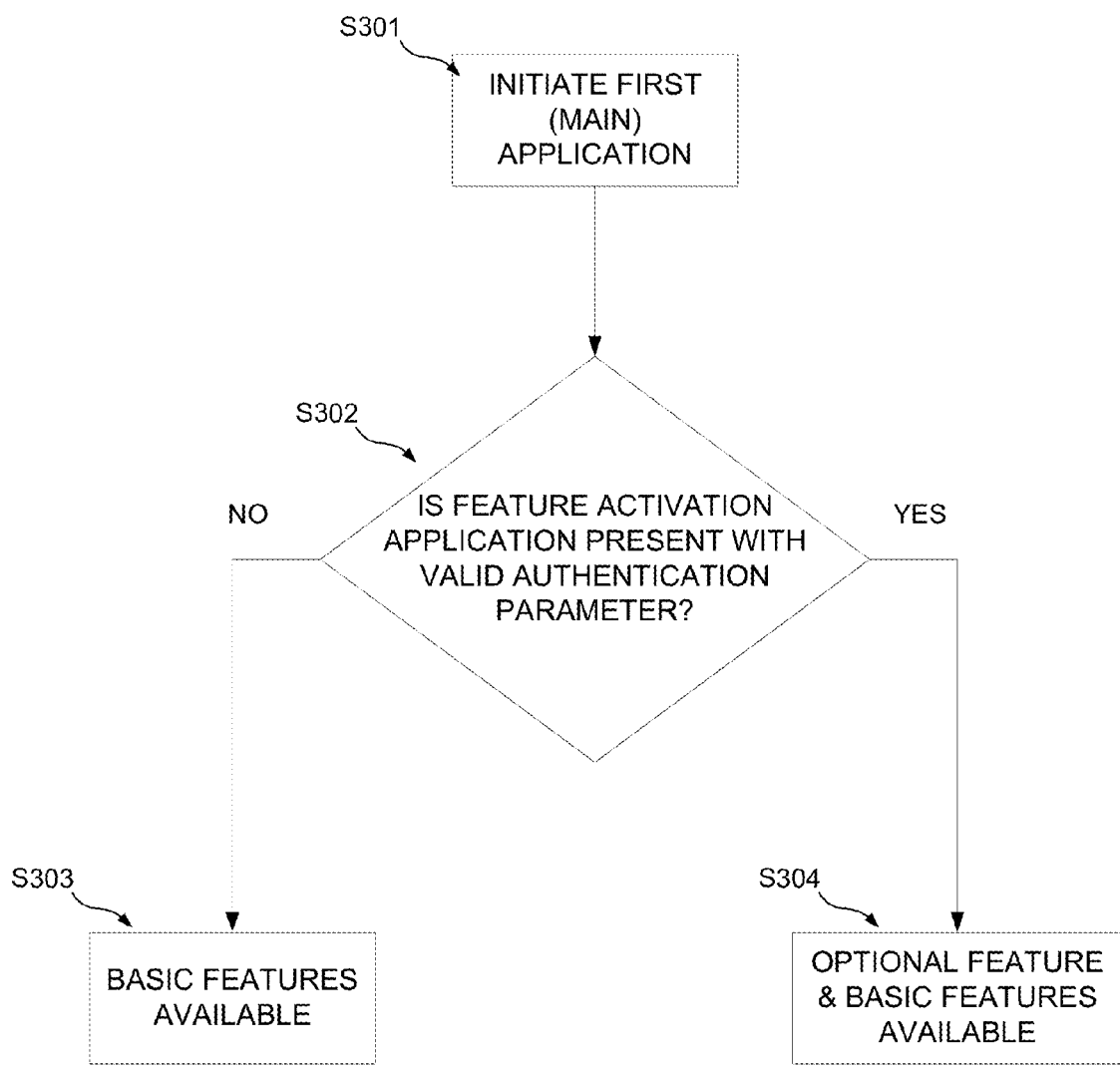
FIG. 3 is a flow diagram illustrating operation of the system according to invention principles.

FIG. 3 illustrates an exemplary flow diagram representative of an algorithm for activating features of an application. In step S301, the first (main) application 120 is initiated. In step S302, the first application 120 determines whether or not the second application (feature activation application) having a valid authentication/activation parameter is present. If the result of the query in S302 is negative, then in S303, the first application makes available to a user only the basic features that are always available. If the result of the query in S302 is positive, the first application 120 makes available optional features indicated by the activation parameter along with the basic features.

Figure 4:
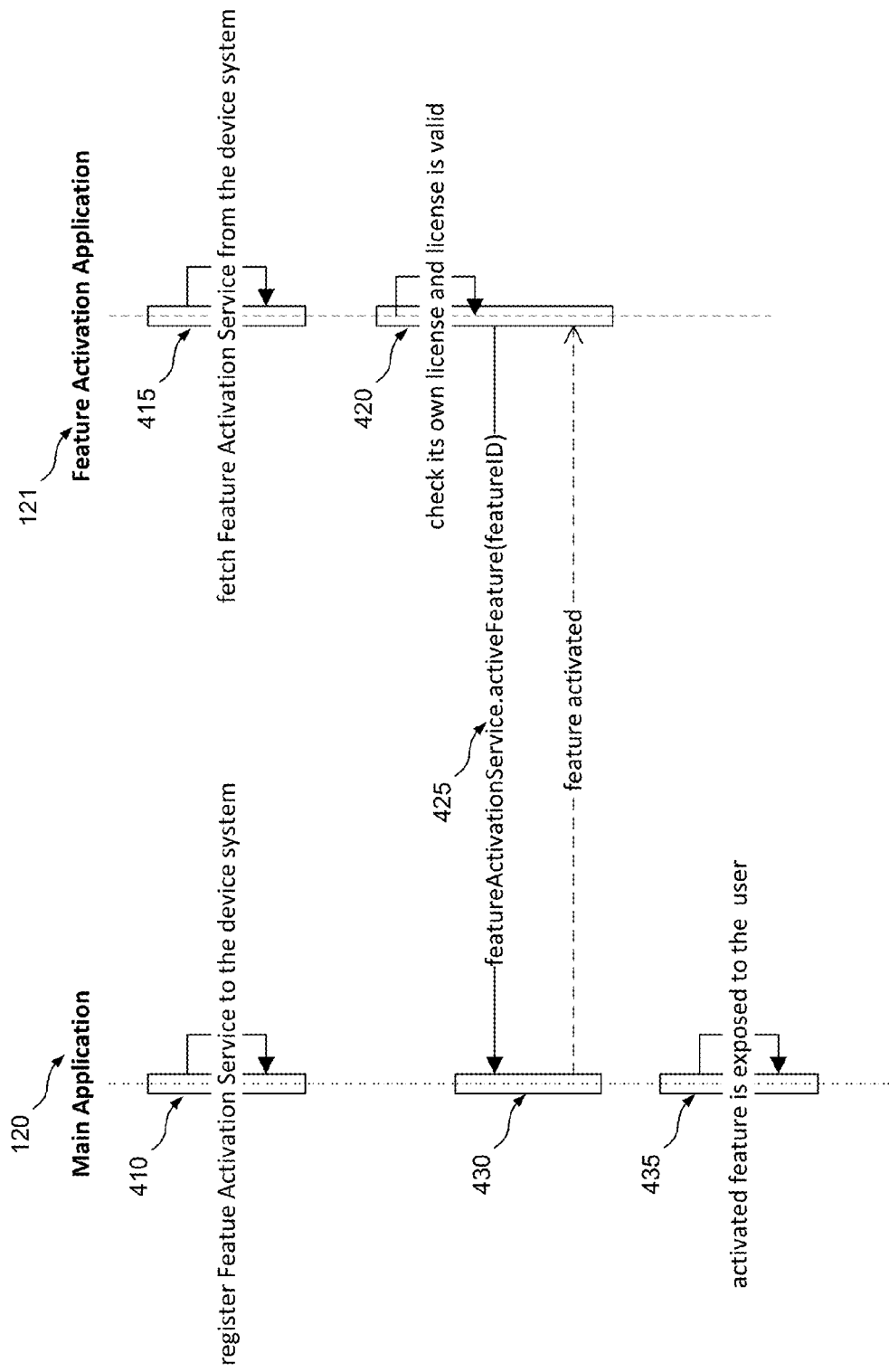
FIG. 4 is a sequence diagram detailing the operation of an application according to invention principles.
Figure 5:
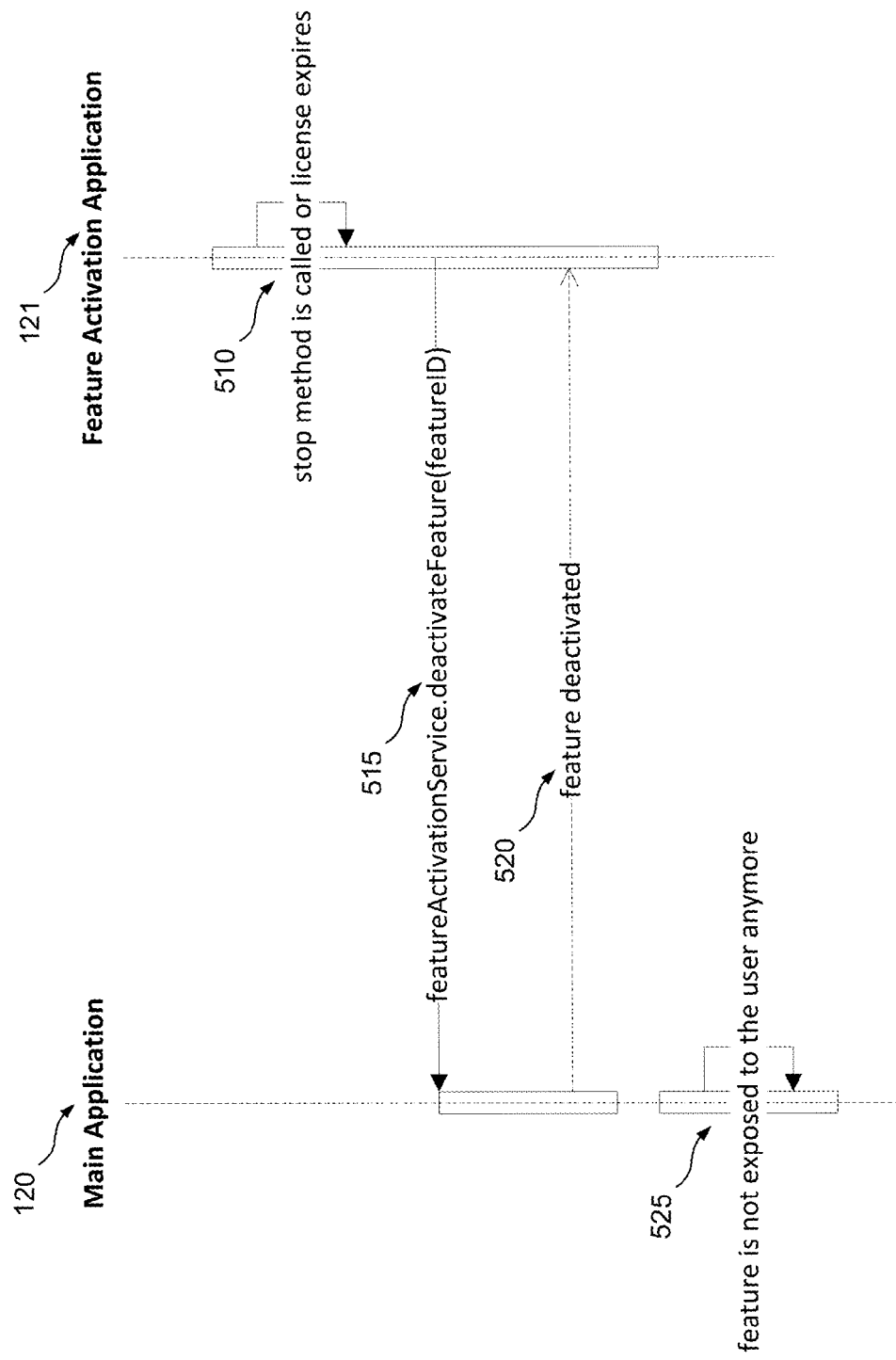
FIG. 5 is a sequence diagram detailing the operation of an application according to invention principles.
Figure 8A:
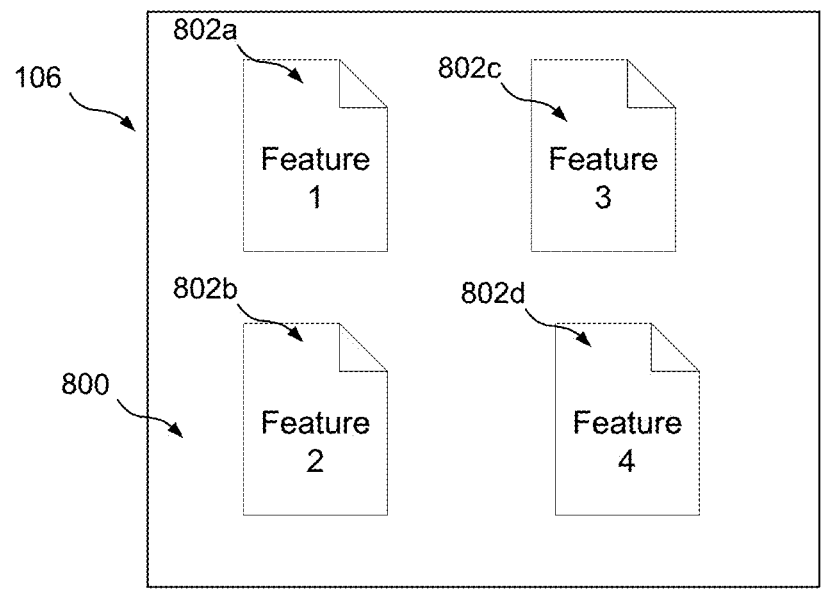
FIGS. 8A & 8B are exemplary user interface display images generated in accordance with invention principles

FIGS. 4 and 5 are software sequence diagrams further detailing aspects of the activation algorithm according to invention principles and will be described using the components discussed above in FIGS. 1 and 2 using similar reference numerals. In FIG. 4, the first application 120 registers, in 410, a feature activation service to the operating system of the image processing device 100. The second application 121, in 415, employs a fetch command to fetch the feature activation service from the operating system of the image processing device 100. In response to importing the feature activation service, the second application 121 executes the validation procedure in 420 to check if license data (e.g. duration data) is valid. Examples as to how this validation check may be performed are discussed above and are incorporated herein by reference. Upon a validity determination, the second application 121 executes the communication function to generate the activation signal including the activation parameter to be provided to the first application 120 in 425. In one embodiment, the activation signal may be a data object. The activation parameter may be embodied as a universally unique identifier (UUID) string that identifies the service being responded to and an activation command along with a feature identifier (e.g. key value). The activation parameter is received at the first application 120. The first application 120, in 431, compares the activation parameter data with the activation data store and modifies entries related to the features identified in the activation parameter to be set to "active" and notifies the second application 121 thereof. Thereafter, the first application 120 exposes, in 435, the activated feature(s) to a user by providing data object representative of all activated features to a user interface generator that generates a user interface including user selectable image elements corresponding to all features indicated as "active" in the activation data store. An example of this is shown in FIG. 8A which is an exemplary user interface 800 displayed on the operation panel 106 of the image processing device 100. As shown herein, the first application 120 has determined, based on the activation parameter received from the second application 121 that features 1-4 are active and thus has generated user selectable image elements 802a-802d respectively corresponding to these features. The UI 800 shown in FIG. 8A will be continually displayed to a user whenever the first application 120 is initiated so long as the activation values in the activation data store of first application 120 have not changed and features 1-4 have the status of "active".

Figure 8B:
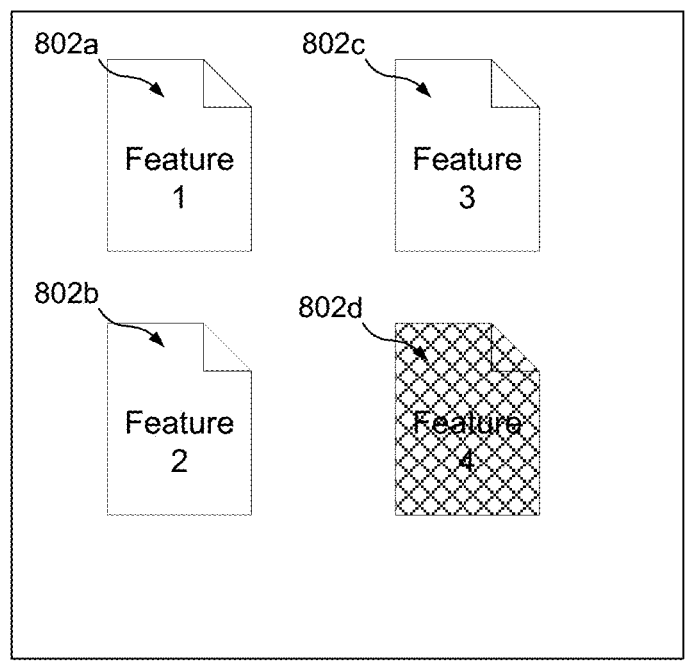

FIG. 5 illustrates the sequence executed by the second application 121 to ensure that the features previously identified as active should remain active. The second application 121 periodically initiates, in 510, the validation procedure to determine if system characteristic data derived from the operating system of the image processing device 100 is no longer within the date range indicated by the duration data included in the second application 121. In response to determining that the license is invalid (e.g. current date exceeds the date indicated in the duration data), the second application 121 generates a deactivation parameter and communicates, in 515, the deactivation parameter to the first application 120. The deactivation parameter includes similar information as the activation parameter with the exception that the feature(s) identified therein are signaled to be deactivated and no longer exposed to the end user. The first application 120, in 520, sends a response message to the second application indicating that the activation status of each feature identified in the deactivation parameter in the activation data store has been changed from "active" to "inactive". In response to deactivation and upon re-initiation of the first application 120, the user interface generated by the first application 120 is modified to prevent access to the features indicated as deactivated in 525. One exemplary manner for showing that access to one or more features has been deactivated is shown user interface 800 of FIG. 8B. In this example, the deactivation request generated in 510 indicated that feature 4 associated with image element 802d should be deactivated. This results in the image element 802d associated with feature 4 being shown as inactive (e.g. shown with cross-hatching). Thus, it provides the user with information identifying all of the features of the first application 120 but controls access to one or more thereof. In another embodiment, the first application 120 may delete or otherwise prevent the image elements 802*d* representing feature 4 from being displayed in FIG. 8B.

Figure 6A:
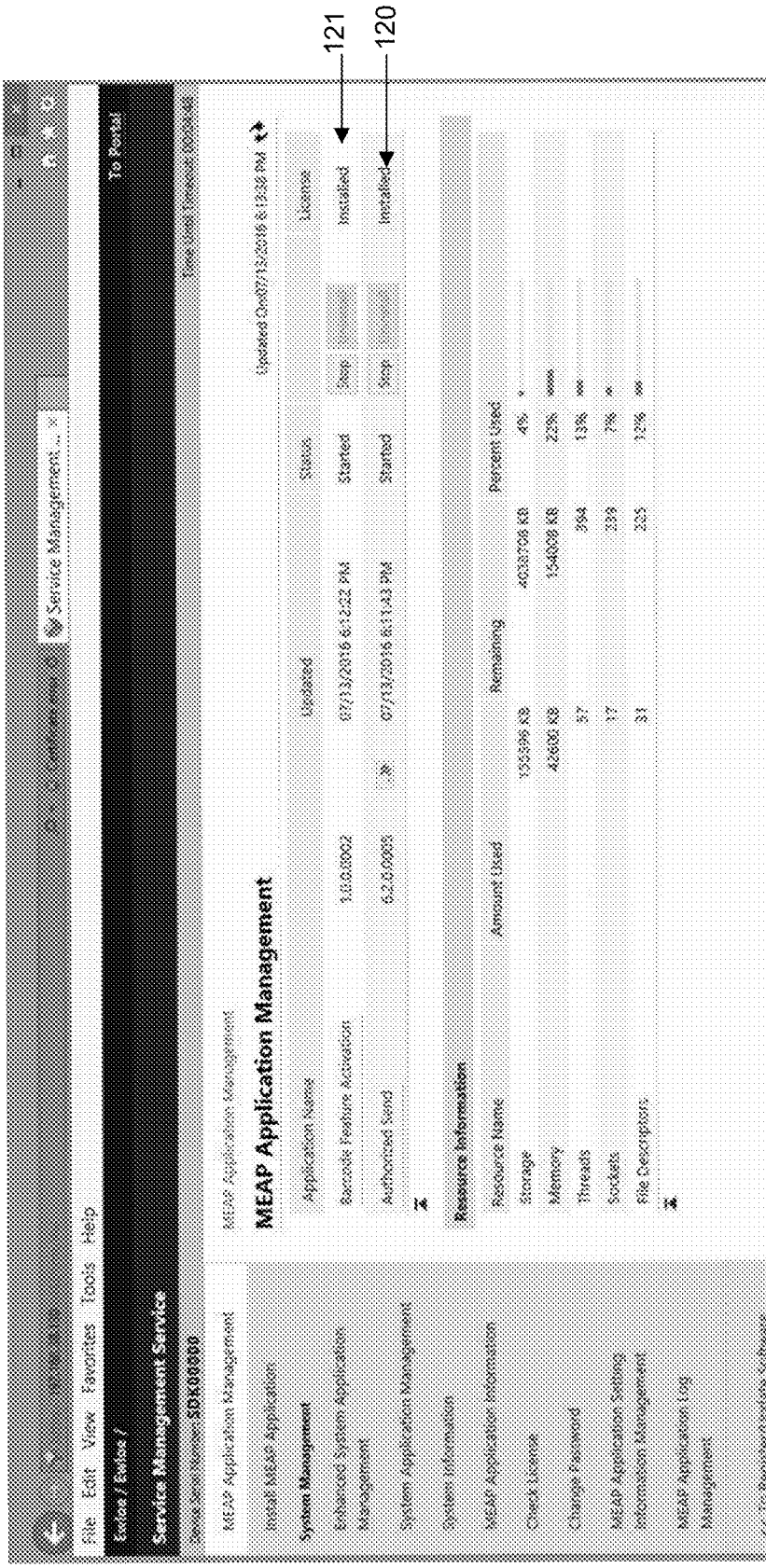
FIG. 6A is an exemplary user interface display image generated by an application in accordance with invention principles.

FIG. 6A is an exemplary user interface 600 that may be generated by a management application. In one embodiment, this may include the management application 212 executing on client computing device 210 of FIG. 2. In another embodiment, it may be a management application having the same functionality as management application 212 on client 210 but executing on the image processing device 100. As shown herein, the user interface 600 of the management application 212 includes the first application 120 and second activation application 121. In the example shown herein, the first application 120 includes a set of basic features that are available to all users of the first application. In one embodiment, the basic feature include secure transmission of electronic document data generated by the scanning unit of the image processing device 100 to various destinations that allow for and/or require secure or otherwise authorized access for receipt of the electronic document data. The first application 120 further includes at least one additional feature that provides functionality in addition to the basic features. In the embodiment shown here, the at least one an additional feature included in the first application 120 is a barcode naming feature whereby a user can selectively include, as a first page of a scan job, a barcode having a particular data value associated therewith. The barcode naming feature recognizes the barcode and derives the data value encoded therein. The derived data value is then inserted into the file name of the image file created by the scan job. This feature is an example of an additional feature and one that requires activation.

Figure 6B:
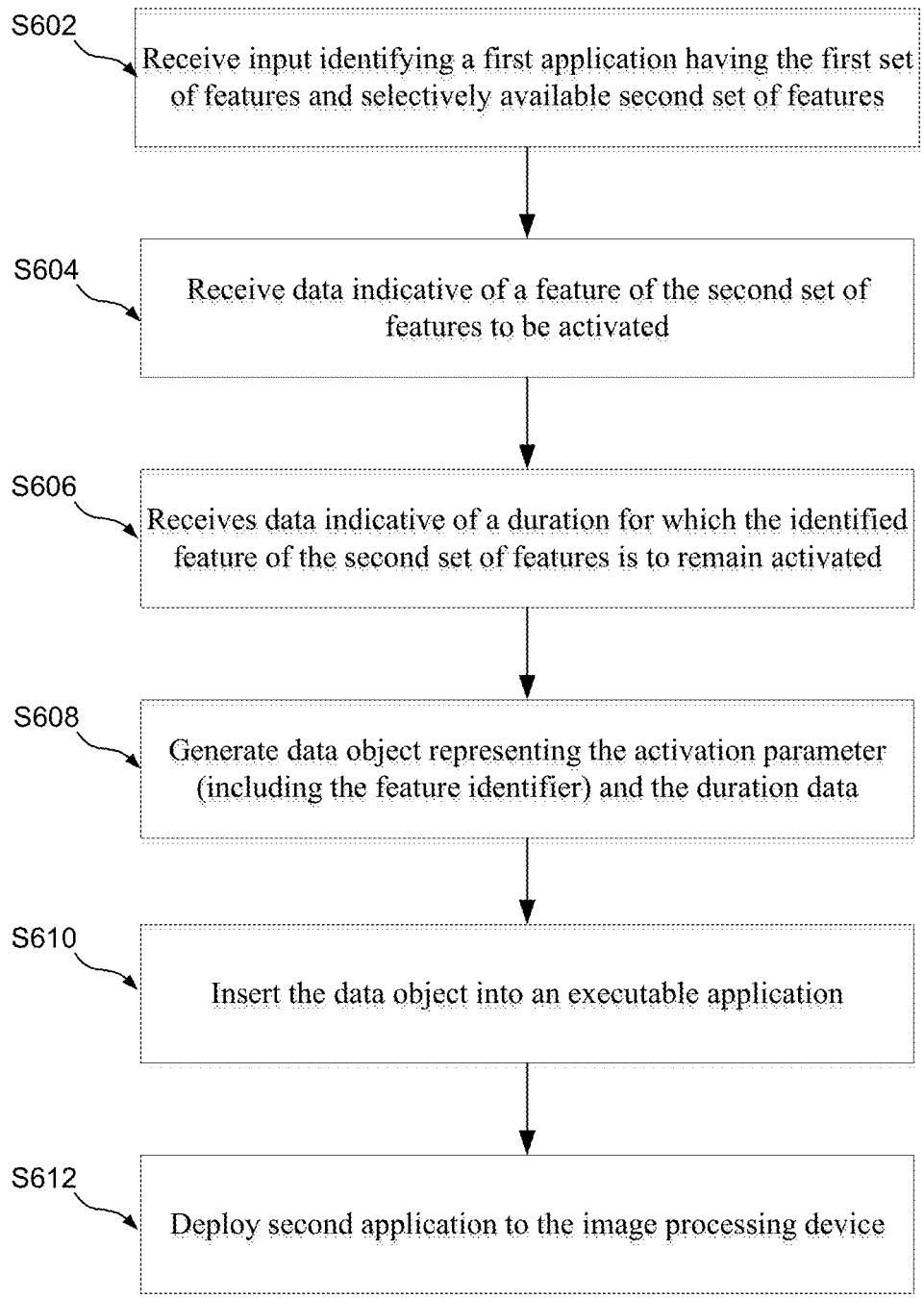
FIG. 6B is a flow diagram detailing exemplary operation of application features according to invention principles.

FIG. 6B represents a flow diagram detailing an exemplary operation of the management application 212 that generates the second application including the activation parameter. The following description describes the generation of the second application having an activation parameter for activating one feature from a set of second features of a first application. However, it should be noted that the same operating principles may be applied to generating a second application having an activation parameter that activates more than one feature of the set of second features. Moreover, it should be understood that this algorithm can be repeated such that a second application is generated including an activation parameter that activates features of two different applications from within the same second application. Operation of the management application 212 will now be described.

In step S602, the management application 212 receives from a user, input identifying a first application having the first set of features always available and a second set of features that are selectively activated based on an activation parameter. In one embodiment, the input received in step S602 may be received through a user interface generated by the management application 212 and displayed on a display device of the computing device. In another embodiment, the input received in step S602 may be received by management application 212 via electronic message or as a data file including information identifying the application having features that need activation and authorization along with a duration for which those features should be active as will be discussed hereinafter.

In step S604, the management application receives data indicative of a feature of the second set of features to be activated. In one embodiment, the management application 212 acquires feature identifier information from an application information source. The application information source includes feature identifiers that identify the different types of features of the first application. The application information further identifies which features are in the first set of features and second set of features and links respective feature identifiers thereto. In one embodiment a single feature identifier may be associated with features in the first set of features and unique identifiers are associated with the features in the second set of features. In another embodiment, a user may be presented, via a user interface generated by the management application 212, application information that identifies features of the application and any feature identifiers associated therewith enabling selection, by a user, of the features of the second set of features to be activated In step 606, the management application 212 receives data indicative of a duration for which the identified feature of the second set of features is to remain activated and available to a user of the first application. In one embodiment, the management application 212 provides a user interface enabling a user to manually input duration data (e.g. expiration data and/or total usage number). In another embodiment, the management application 212 automatically searches a data store containing authorization information that specifies the duration data as determined based on an external obligation. For example, a user of the image processing device 100 may use it under the terms of a contract (e.g. sale, lease, usage contract) that has terms governing use of both the device and any software executing on the device. In this manner, the management application 212 may automatically acquire duration data using data contained in or associated with the external obligation data. For example, the external obligation may indicate that a user has paid for usage of the particular feature for a predetermined time period and, in step 606, the management application 212 may acquire information identifying the predetermined time period for specification as the duration data.

In step 608, the management application 212 generates a data object representing the activation parameter, which includes the feature identifier, and duration data and inserts the data object into an executable application in step 610. In certain embodiments, the activation parameter and duration data are two separate data objects. The executable application generated in 610 is the activation application and can be selectively deployed, in step 612, to a target image processing device having the first application 120 executing thereon. The deployment in 612 enables activation of the feature of the second set of features associated with the included feature identifier for a duration indicated by the duration data. In one embodiment, deployment of the activation application may occur by transmitting data representing the activation application over a network for receipt by the image processing device which uses an installation routine to install the activation application. In another embodiment, the deployment may occur in response to activation request issued by the first application having the second set of features desired to be activated and which was received by the management application 212 via a network. In a further embodiment, deployment 612 may include compiling the activation application and exporting the activation application to an external storage device which may be directly inserted into an I/O port of the image processing device resulting in installation thereof.

The activation application in which the activation parameter is inserted advantageously includes no functionality for performing the feature to be activated. Instead, it is a lightweight, non-resource intensive application that includes only information identifying a feature and an activation duration along with a communication function for checking a status with an operating system to determine if the service provided by the activation application is registered in an image processing device and communicates activation parameter data to the first application. The activation application also includes a validation function to acquire device characteristic data including but not limited to a current date value to determine if the feature included in the activation parameter should remain active. In the event the comparison of the device characteristic and duration data indicate that the feature should be inactivated, the application may also generate a deactivation parameter indicating that the feature should be inactivated. In other embodiments, the validation feature listens for expiration events generated by an operating system which has used the information in the duration data in its license management service to provide the second application 121 with information indicating that the license indicated by the duration data is one of valid or invalid.

It should be further understood that the management application 212 may execute on a client computing device such a laptop to allow a user (or distributor) to perform the operations described hereinabove. In another embodiment, the management application 212 may execute on a management server that includes applications for managing a fleet of image processing devices at one or more locations. In this embodiment, generation and deployment of the activation application can occur to a plurality of image processing devices simultaneously enabling all users to be able to use the activated features across all image processing devices in the fleet.

Figure 7:
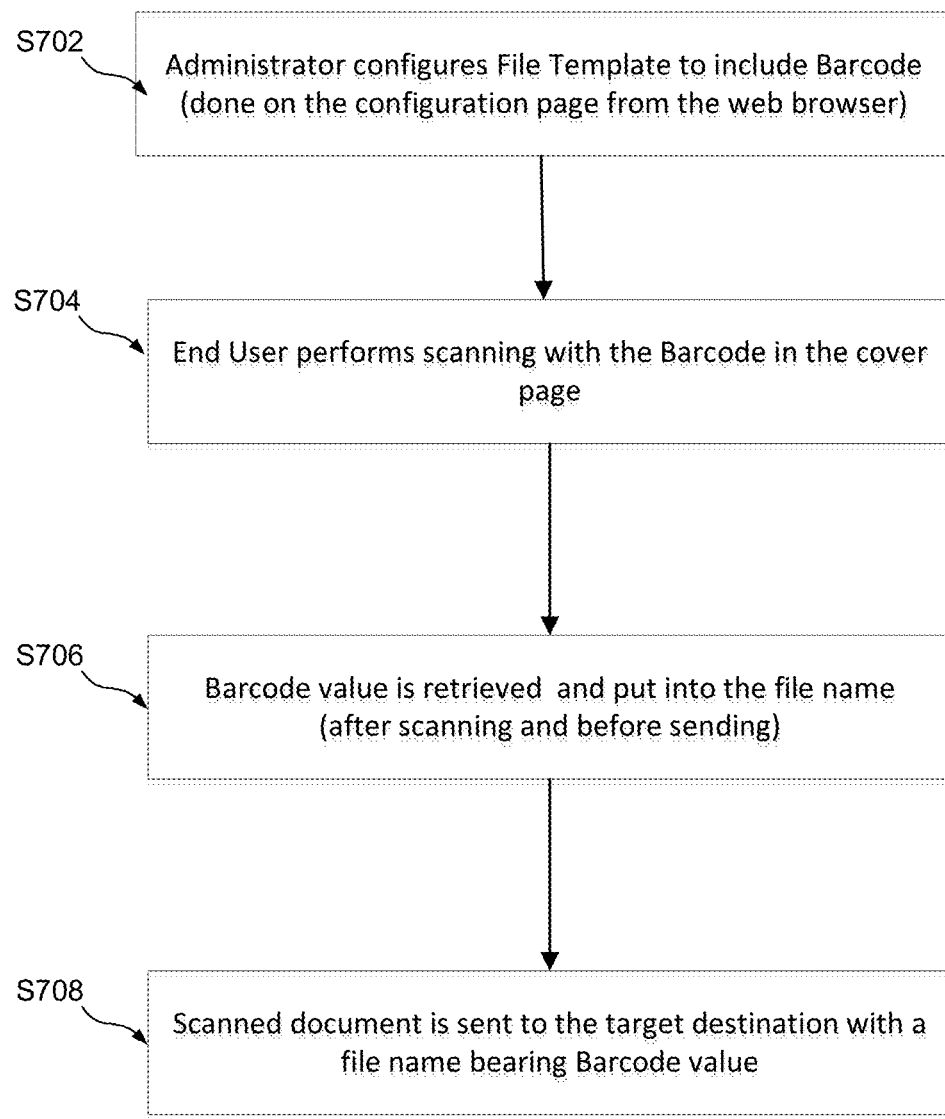
FIG. 7 is a flow diagram detailing exemplary operation of application features according to invention principles.

A flow diagram detailing the operation of the additional feature described herein is shown in FIG. 7. Therein, in step S702, a file naming template is configured to include a data value derived from a barcode scanned during a scan job. In step S704, the scan job is performed including a first page having at least one barcode printed thereon. The barcode value is retrieved in step S706 and the retrieved value is inserted into the file name to be associated with the image file generated by the scan job. In step S708, the scanned document is communicated using the secure transmission feature, which is basic feature of the first application 120, with the file name including the value retrieved from the scanned barcode.

The embodiment described above with respect to FIGS. 6A-6B and FIG. 7 are provided for illustrative purposes only and should not be construed as limiting. Any type of feature that is associated with the creation of a file to be transmitted using an authorized sending procedure may be included with the second set of features.

Figure 9:
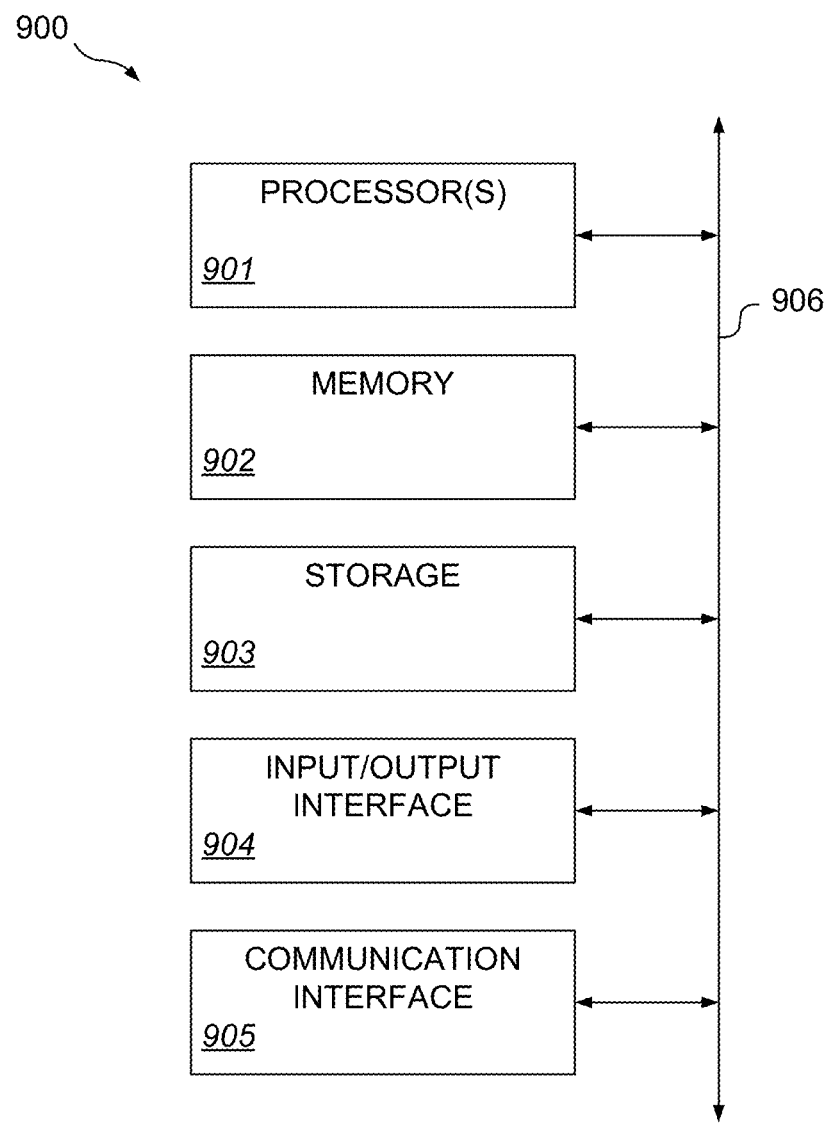
FIG. 9 illustrates an exemplary computing device.

FIG. 9 illustrates the hardware components of computing system 210 and/or server 230 with which the image processing device 100 may communicate and referenced herein generally as system 900. According to various embodiments, all or a portion of the description of the system 900 is applicable to all or a portion of one or more of the server 50 or any other computing system. Additionally, the descriptions of the hardware components contained herein apply to similarly named hardware components in any of the image processing device 900.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the system 900 performs one or more steps of one or more methods described or illustrated herein. In some embodiments, the system 900 provides functionality described or illustrated herein. In some embodiments, software running on the system 900 performs one or more steps of one or more methods described or illustrated herein or provides functionality described or illustrated herein. Some embodiments include one or more portions of the system 900.

The system 900 includes one or more processor(s) 901, memory 902, storage 903, an input/output (I/O) interface 904, a communication interface 905, and a bus 906. The system 900 may take any suitable physical form. For example, and not by way of limitation, the system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 901 include hardware for executing instructions, such as those making up a computer program. The processor(s) 901 may retrieve the instructions from the memory 902, the storage 903, an internal register, or an internal cache. The processor(s) 901 then decode and execute the instructions. Then, the processor(s) 901 write one or more results to the memory 902, the storage 903, the internal register, or the internal cache. The processor(s) 901 may provide the processing capability to execute the operating system, programs, user and application interfaces, and any other functions of the system 900.

The processor(s) 901 may include a central processing unit (CPU), one or more general-purpose microprocessor(s), application-specific microprocessor(s), and/or special purpose microprocessor(s), or some combination of such processing components. The processor(s) 901 may include one or more graphics processors, video processors, audio processors and/or related chip sets.

In some embodiments, the memory 902 includes main memory for storing instructions for the processor(s) 901 to execute or data for the processor(s) 901 to operate on. By way of example, the system 900 may load instructions from the storage 903 or another source to the memory 902. During or after execution of the instructions, the processor(s) 901 may write one or more results (which may be intermediate or final results) to the memory 902. One or more memory buses (which may each include an address bus and a data bus) may couple the processor(s) 901 to the memory 902. One or more memory management units (MMUs) may reside between the processor(s) 901 and the memory 902 and facilitate accesses to the memory 902 requested by the processor(s) 901. The memory 902 may include one or more memories. The memory 902 may be random access memory (RAM).

The storage 903 stores data and/or instructions. As an example and not by way of limitation, the storage 903 may include a hard disk drive, a floppy disk drive, flash memory, an optical disc, a magneto-optical disc, magnetic tape, or a Universal Serial Bus (USB) drive or a combination of two or more of these. In some embodiments, the storage 903 is a removable medium. In some embodiments, the storage 903 is a fixed medium. In some embodiments, the storage 903 is internal to the system 900. In some embodiments, the storage 903 is external to the system 900. In some embodiments, the storage 903 is non-volatile, solid-state memory. In some embodiments, the storage 903 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 903 may include one or more memory devices. One or more program modules stored in the storage 903 may be configured to cause various operations and processes described herein to be executed.

The I/O interface 904 includes hardware, software, or both providing one or more interfaces for communication between the system 900 and one or more I/O devices. The system 900 may include one or more of these I/O devices, where appropriate. One or more of these I/O devices may enable communication between a person and the system 900. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 904 includes one or more device or software drivers enabling the processor(s) 901 to drive one or more of these I/O devices. The I/O interface 904 may include one or more I/O interfaces.

The communication interface 905 includes hardware, software, or both providing one or more interfaces for communication (such as, for example, packet-based communication) between the system 900 and one or more other servers or one or more networks. As an example and not by way of limitation, the communication interface 905 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 905 for it. As an example and not by way of limitation, the system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the system 900 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The system 900 may include any suitable communication interface 905 for any of these networks, where appropriate. The communication interface 905 may include one or more communication interfaces 905.

The bus 906 interconnects various components of the system 900 thereby enabling the transmission of data and execution of various processes. The bus 906 may include one or more types of bus structures including a memory bus or memory controller, a peripheral bus, and a local bus using any of a variety of bus architectures.

The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

We claim:

1. A feature activation system for activating one or more features of an application executing on an image processing device comprising:
   one or more processors; and
   a memory storing one or more applications that are executed by the one or more processors, the one or more applications include
   a first application having
      a first set of features that control one or more functions of the image processing device and are always available for use within the first application, and
      a second set of features controlling at least one function different from the one or more functions controlled by the first set of features, each feature of the second set of features requiring activation, via an activation parameter, to be made available for use within the first application,
      wherein the first application issues an activation request to an operating system to indicate which of the second set of features should be activated to be made available for use within the first application;
   a second application executing on the image processing device, the second application including the activation parameter that enables the first application to selectively activate one or more of the features in the second set of features within the first application, wherein
      in response to detecting, by the second application, via the operating system, that an activation request was issued by the first application, the second application communicates the activation parameter to activate, within the first application, the one or more features of the second set of features indicated by the activation parameter to be made available for use within the first application.

2. The system according to claim 1, wherein
the activation request issued by the first application includes registering, in the operating system of the image processing device, an activation service, and the second application detects the registration by importing the registered service from the operating system.

3. The system according to claim 2, wherein
in response to detecting the activation service by the second application, a channel is opened between the first application and second application, and the activation parameter is communicated from the second application to the first application via the opened channel.

4. The system according to claim 1, wherein
the activation parameter includes at least one of (a) a feature identifier identifying a respective one of the features included in the second set of features, and (b) a group identifier identifying at least two features of the second set of features.

5. The system according to claim 1, wherein
the second application includes duration data identifying a duration that respective one of the features included in the second set of features is to remain active.

6. The system according to claim 5, wherein
the second application registers the duration data with an operating system of the image processing device; and
periodically checks with the operating system to obtain a device characteristic and determines that
the one or more features of the second set of features should remain active when a first predetermined condition is met, and
the one or more features of the second set of features should be inactivated when a second predetermined condition is met.

7. The system according to claim 6, wherein
the device characteristic is an expiration event and the first predetermined criteria is met when a value of the duration data included in the second application is earlier in time than a current date.

8. The system according to claim 6, wherein
the device characteristic is an expiration event and the second predetermined criteria is met when a value of the duration data included in the second application is later in time than a current date.

9. The system according to claim 6, wherein
in response to determining that the second predetermined condition is met, the second application
generates a deactivation parameter including information indicating that the one or more features of the second set of features is to be inactivated, and
communicates the deactivation parameter to the first application causing the indicated one or more features of the second set of features to be unavailable to users of the image processing device.

10. The system according to claim 1, wherein
the duration data includes at least one of (a) a date value indicating a date on which the respective feature of the second set of features will expire; and (b) a total use value indicating a total number of times the respective feature of the second set of features may be accessed and used.

11. The feature activation system of claim 1, wherein
the first set of features are always available for selection within a user interface generated by the first application; and
the activation of the one or more second set of feature associated with the activation parameter enables selection from within the user interface generated by the first application.

12. The feature activation system of claim 1, wherein
the first application generates a user interface including
first image elements in a first display state representing respective ones of the first set of features, and
second image elements in second display state different from the first display state representing respective ones of the second set of feature, the second image elements in the second state being visible to a user within the user interface but not selectable by a user.

13. The feature activation system of claim 12, wherein
in response to the first application receiving the activation parameter, the first application changes a display state of respective ones of the second set of features associated with the activation parameter from the second display state to the first display state.

14. A method of activating one or more features of an application executing on an image processing device comprising:
issuing, by a first application stored in memory and executing on the image processing device, an activation request to an operating system, the first application including
a first set of features that control one or more functions of the image processing device and are always available for use within the first application, and
a second set of features controlling at least one function different from the one or more functions controlled by the first set of features, each feature of the second set of features requiring activation, via an activation parameter, to be made available for use within the first application, wherein the activation request issued to the operating system indicates which of the second set of features should be activated to be made available for use within the first application;
detecting, by a second application stored in memory and executing on the image processing device, via the operating system, that an activation request has been issued by the first application to the operating system,
communicating, to the first application, an activation parameter included in the second application, the activation parameter that enables the first application to selectively activate the one or more features of the second set of features;
activating, within the first application, one or more of the features in the second set of features indicated by the activation parameter,
enabling, by the first application, user access to the activated one or more features of the second set of features.

15. The method according to claim 14, wherein
issuing the activation request includes registering, in an operating system of the image processing device, an activation service, and
detecting the activation request by the second application includes importing, from the operating system, the registered activation service.

16. The method according to claim 15, further comprising
opening a channel between the first application and second application in response to detecting the activation service by the second application, and
communicating the activation parameter from the second application to the first application via the opened channel.

17. The method according to claim 14, wherein
the activation parameter includes at least one of (a) a feature identifier identifying a respective one of the features included in the second set of features, and (b) a group identifier identifying at least two features of the second set of features.

18. The method according to claim 17, wherein
the second application includes duration data identifying a duration that respective one of the features included in the second set of features is to remain active.

19. The method according to claim 18, wherein
the duration data includes at least one of (a) a date value indicating a date on which the respective feature of the second set of features will expire; and (b) a total use value indicating a total number of times the respective feature of the second set of features may be accessed and used.

20. The method according to claim 14, further comprising
registering, by the second application, the duration data with an operating system of the image processing device; and
periodically checking with the operating system to obtain a device characteristic and determining that
the one or more features of the second set of features should remain active when a first predetermined condition is met, and
the one or more features of the second set of features should be inactivated when a second predetermined condition is met.

21. The method according to claim 20, wherein
the device characteristic is an expiration event and the first predetermined criteria is met when a value of the duration data included in the second application is earlier in time than a current date.

22. The system according to claim 20, wherein
the device characteristic is an expiration event and the second predetermined criteria is met when a value of the duration data included in the second application is later in time than a current date.

23. The method according to claim 20, further comprising
in response to determining that the second predetermined condition is met,
generating, by the second application, a deactivation parameter including information indicating that the one or more features of the second set of features is to be inactivated, and
communicating the deactivation parameter to the first application causing the indicated one or more features of the second set of features to be unavailable to users of the image processing device.

24. An image processing device comprising:
one or more processors; and
a memory storing a first application that, when executed by the one or more processors
detects, via an operating system, that an activation request has been issued to the operating system by second application, the second application includes
a first set of features that control one or more functions of the image processing device and are always available for use within the first application, and
a second set of features controlling at least one function different from the one or more functions controlled by the first set of features, each feature of the second set of features requiring activation, via an activation parameter, to be made available for use within the first application,
wherein the activation request issued by the second application indicates which of the second set of features should be activated to be made available for use within the first application;
opens a communication channel between the first application and a second application executing on the image processing device in response to determining that the second application has issued an activation request,
communicates, via the opened communication channel, an activation parameter that enables the second application to selectively activate one or more features of the second set of features indicated by the activation parameter within the second application to be made available for use within the second application.

25. The image processing device according to claim 24, wherein execution of the first application further
registers duration data with an operating system of the image processing device; and
periodically checks with the operating system to obtain a device characteristic and determines that
the one or more features of the second set of features should remain active when a first predetermined condition is met, and
the one or more features of the second set of features should be inactivated when a second predetermined condition is met.

26. The image processing device according to claim 25 wherein
the device characteristic is an expiration event and the first predetermined criteria is met when a value of the duration data included in the first application is earlier in time than a current date.

27. The image processing device according to claim 25 wherein
the device characteristic is an expiration event and the second predetermined criteria is met when a value of the duration data included in the first application is later in time than a current date.

28. The image processing device according to claim 25 wherein
in response to determining that the second predetermined condition is met, the first application
generates a deactivation parameter including information indicating that the one or more features of the second set of features is to be inactivated, and
communicates the deactivation parameter to the first application causing the indicated one or more features of the second set of features to be unavailable to users of the image processing device.

29. An image processing device comprising:
one or more processors; and
a memory storing a first application including
a first set of features that control one or more functions of the image processing device and are always available for use within the first application, and
a second set of features controlling at least one function different from the one or more functions controlled by the first set of features, each feature of the second set of features requiring activation, via an activation parameter, to be made available for use within the first application, wherein the first application, when executed by the one or more processors
issues an activation request to an operating system of the image processing device to indicate which of the second set of features should be activated to be made available for use within the first application;

receives, an activation parameter that enables the first application to selectively activate one or more of the features in the second set of features within the first application from a second application that has opened a channel with the first application, wherein the channel opened in response to the second application detecting, via the operating system, that the activation request has been issued;

parses the activation parameter to identify one or more features of the second set of features to be activated and be made available within the first application; and generates, within the first application, a user interface display image including user selectable image elements representing the first set of features and the activated one or more features of the second set of features.

30. The image processing device according to claim 29, wherein the first application prior to receiving the activation parameter, generates a user interface display image including user selectable image elements associated with the first set of features and image elements associated with the second set of features that cannot be selected by a user.

31. The image processing device according to claim 29, wherein the first application receives a deactivation parameter including information indicating that the one or more features of the second set of features to be inactivated, the deactivation parameter being generated by the second application in response to the comparing a device characteristic obtained from the image processing device with the activation parameter and determining that the one or more features of the second set of features is to be inactivated; and modifying the user interface by causing image elements associated with the one or more features of the second set of features to be inactive.

* * * * *